US011115939B2

(12) United States Patent (10) Patent No.: US 11,115,939 B2
Cheng et al. (45) Date of Patent: Sep. 7, 2021

(54) NR PHR DESIGN FOR MMWAVE DEPLOYMENT

(71) Applicant: QUALCOMM Incorporated, San Diego, CA (US)

(72) Inventors: Peng Cheng, Beijing (CN); Keiichi Kubota, Tokyo (JP); Gavin Bernard Horn, La Jolla, CA (US); Aleksandar Damnjanovic, Del Mar, CA (US); Tao Luo, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 16/500,749

(22) PCT Filed: May 12, 2017

(86) PCT No.: PCT/CN2017/084143
§ 371 (c)(1),
(2) Date: Oct. 3, 2019

(87) PCT Pub. No.: WO2018/205257
PCT Pub. Date: Nov. 15, 2018

(65) Prior Publication Data
US 2020/0084735 A1 Mar. 12, 2020

(51) Int. Cl.
*H04W 52/36* (2009.01)
*H04W 24/10* (2009.01)
(Continued)

(52) U.S. Cl.
CPC ......... *H04W 52/365* (2013.01); *H04W 24/10* (2013.01); *H04W 52/146* (2013.01);
(Continued)

(58) Field of Classification Search
CPC . H04W 52/365; H04W 24/10; H04W 52/146; H04W 52/34; H04W 52/367;
(Continued)

(56) References Cited

U.S. PATENT DOCUMENTS

| 8,867,440 B2 | 10/2014 | Ho et al. |
| 2014/0221038 A1 | 8/2014 | Nakashima et al. |

(Continued)

FOREIGN PATENT DOCUMENTS

| CN | 105766034 A | 7/2016 |
| WO | WO-2011150361 A1 | 12/2011 |

(Continued)

OTHER PUBLICATIONS

Pukari, Ville. "LTE Evolution Towards 5G." (Year: 2016).*
(Continued)

*Primary Examiner* — Sharad Rampuria
(74) *Attorney, Agent, or Firm* — Danai Nelisile Mhembere; Norton Rose Fulbright LLP

(57) ABSTRACT

New radio (NR) power headroom report (PHR) design for millimeter wave (mmWave) deployment is discussed. The power control process for mmWave may include beam-specific periodic PHR reporting and user equipment (UE)-specific event-trigger PHR reporting. The periodic PHR reporting may either provide a single PHR that includes power headroom information for each of the serving beams, or the UE may be configured to measure and report PHR for different beams in different slots. When reporting a single PHR with power headroom information for multiple serving beams, a beam index may be included in the reserved bits of the PHR. For the event-trigger PHR, the PHR reported based on a detected event trigger may provide power headroom information only for the current serving beam, or for all serving beams.

33 Claims, 10 Drawing Sheets

(51) Int. Cl.
   *H04W 52/14* (2009.01)
   *H04W 52/34* (2009.01)
   *H04W 52/42* (2009.01)
(52) U.S. Cl.
   CPC ......... *H04W 52/34* (2013.01); *H04W 52/367* (2013.01); *H04W 52/42* (2013.01)
(58) Field of Classification Search
   CPC ..... H04W 72/04; H04W 72/12; H04W 76/00; H04W 52/42; H04B 7/2123; H04B 7/2121; H04J 2203/0069; H04Q 2213/394
   See application file for complete search history.

(56) References Cited

U.S. PATENT DOCUMENTS

| | | | |
|---|---|---|---|
| 2015/0098424 A1 | 4/2015 | Li | |
| 2020/0145079 A1* | 5/2020 | Marinier | H04B 7/0456 |

FOREIGN PATENT DOCUMENTS

| | | |
|---|---|---|
| WO | WO-2014109707 A1 | 7/2014 |
| WO | WO-2016022219 A1 | 2/2016 |

OTHER PUBLICATIONS

Turkka, Jussi, and Jani Puttonen. "Using LTE power headroom report for coverage optimization." 2011 IEEE Vehicular Technology Conference (VTC Fall). IEEE, 2011. (Year: 2011).*
Samsung; "PHR Triggering Event for Beamforming Transmission", 3GPP Draft; R2-1705605, 3rd Generation Partnership Project (3GPP), 3GPP TSG-RAN WG2 Meeting #98, Hangzhou, China, vol. RAN WG2, May 6, 2017 (May 6, 2017), pp. 1-3.
Interdigital Communications: "Power Headroom Report for NR", 3GPP Draft; R2-1703090, 3rd Generation Partnership Project (3GPP), 3GPP TSG-RAN WG2 #97bis, Spokane, Washington, vol. RAN WG2, Apr. 3, 2017 (Apr. 3, 2017), pp. 1-2.
Samsung; "PHR Format for Beam Specific Power Control", 3GPP Draft; R2-1703357, 3rd Generation Partnership Project (3GPP), 3GPP TSG-RAN WG2 Meeting #97bis, Spokane, US, vol. RAN WG2, Apr. 3, 2017 (Apr. 3, 2017), pp. 1-3.
International Search Report and Written Opinion—PCT/CN2017/084143—ISA/EPO—dated Jan. 29, 2018.
Catt: "NR Measurements and Mobility Management in Idle and Connected State", 3GPP Draft, 3GPP TSG RAN WG1 Meeting #88bis, R1-1704542_NR_Measurements, 3rd Generation Partnership Project (3GPP), Mobile Competence Centre, 650, Route Des Lucioles, F-06921 Sophia-Antipolis Cedex, France vol. RAN WG1 No. Spokane, WA, USA, Apr. 3, 2017-Apr. 7, 2017, Apr. 2, 2017 (Apr. 2, 2017), XP051242683, pp. 1-6, Retrieved from the Internet: URL:http://www.3gpp.org/ftp/Meetings_3GPP_SYNC/RAN1/Docs/ [retrieved on Apr. 2, 2017] the Whole Document.
Interdigital Inc: "Power Headroom Reporting for NR", 3GPP Draft, 3GPP TSG-RAN WG2 #98, R2-1704915 (R15 NR WI AI103110 PHR), 3rd Generation Partnership Project (3GPP), Mobile Competence Centre ; 650, Route Des Lucioles ; F-06921 Sophia-Antipolis Cedex ; France vol. RAN WG2, No. Hangzhou, May 15, 2017-May 19, 2017, May 6, 2017 (May 6, 2017), XP051264646, 2 pages, Retrieved from the Internet: URL: http://www.3gpp.org/ftp/tsg_ran/WG2_RL2/TSGR2_98/Docs/. [retrieved on May 6, 2017], the whole document.
Mediatek Inc: "Discussion on DL RRM Measurement", 3GPP Draft, 3GPP TSG RAN WG1 Meeting #88bis, R1-1704440_DL RRM Measurement_Final, 3rd Generation Partnership Project (3GPP), Mobile Competence Centre, 650, Route Des Lucioles, F-06921 Sophia-Antipolis Cedex, France vol. RAN WG1, No. Spokane, USA, Apr. 3, 2017-Apr. 7, 2017, Mar. 25, 2017 (Mar. 25, 2017), XP051251233, 5 Pages, Retrieved from the Internet: URL:http://www.3gpp.org/ftp/tsg_ran/WG1_RL1/TSGR1_88b/Docs/ [retrieved on Mar. 25, 2017] the Whole Document.
Samsung: "PHR Triggering Event for Beamforming Transmission", 3GPP Draft, 3GPP TSG-RAN WG2 Meeting #97bis, R2-1703355, PHR Triggering Event for Beamforming Transmission, 3rd Generation Partnership Project (3GPP), Mobile Competence Centre, 650, Route Des Lucioles, F-06921 Sophia-Antipolis Cedex, France, vol. RAN WG2, No. Spokane, US, Apr. 3, 2017-Apr. 7, 2017, Apr. 3, 2017 (Apr. 3, 2017), XP051245223, 3 pages, Retrieved from the Internet: URL: http://www.3gpp.org/ftp/Meetings_3GPP_SYNC/RAN2/Docs/. [retrieved on Apr. 3, 2017] the whole document.
Supplementary European Search Report—EP17909003—Search Authority—The Hague—dated Nov. 13, 2020.
Supplementary European Search Report—EP17909003—Search Authority—The Hague—dated Mar. 19, 2021.

* cited by examiner

NR PHR DESIGN FOR MMWAVE DEPLOYMENT

This application claims the benefit of PCT/CN2017/084143, entitled, "NR PHR DESIGN FOR MMWAVE DEPLOYMENT" filed on May 12, 2017, which is expressly incorporated by reference herein in its entirety.

BACKGROUND

Field

Aspects of the present disclosure relate generally to wireless communication systems, and more particularly, to new radio (NR) power headroom report (PHR) design for millimeter wave (mmWave) deployment.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks. Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, by a UE, a beam-specific periodic power headroom report (PHR) in response to expiration of a first reporting timer, wherein the UE receives communications from a serving base station over one or more serving beams beamformed by the serving base station, transmitting, by the UE, the beam-specific periodic PHR to the serving base station, detecting, by the UE, a report triggering event, determining, by the UE, a UE-specific trigger PHR in response to the report triggering event and expiration of a second reporting timer, and transmitting, by the UE, the UE-specific trigger PHR to the serving base station.

In an additional aspect of the disclosure, a method of wireless communication includes receiving, at a UE, an identification signal from a serving base station, wherein the identification signal identifies one or more reference signals for pathloss measurement, measuring, by the UE, a pathloss on the one or more reference signals identified by the identification signal, comparing, by the UE, the pathloss to a threshold trigger value, and activating, by the UE, power headroom reporting in response to the pathloss exceeding the threshold trigger value.

In an additional aspect of the disclosure, a method of wireless communication includes determining, by a UE, a time period since a last beam change of one or more serving beams received at the UE from a serving base station, measuring, by the UE, a pathloss of a beam-specific layer 3 reference signal on a current serving beam in response to the time period exceeding a minimum time threshold, and measuring, by the UE, the pathloss of a beam-specific layer 1 reference signal on the current serving beam in response to the time period being below the minimum time threshold.

In an additional aspect of the disclosure, an apparatus configured for wireless communication, includes means for determining, by a UE, a beam-specific periodic PHR in response to expiration of a first reporting timer, wherein the UE receives communications from a serving base station over one or more serving beams beamformed by the serving base station, means for transmitting, by the UE, the beam-specific periodic PHR to the serving base station, means for detecting, by the UE, a report triggering event, means for determining, by the UE, a UE-specific trigger PHR in response to the report triggering event and expiration of a second reporting timer, and means for transmitting, by the UE, the UE-specific trigger PHR to the serving base station.

In an additional aspect of the disclosure, an apparatus configured for wireless communication, includes means for receiving, at a UE, an identification signal from a serving base station, wherein the identification signal identifies one or more reference signals for pathloss measurement, means for measuring, by the UE, a pathloss on the one or more reference signals identified by the identification signal, means for comparing, by the UE, the pathloss to a threshold trigger value, and means for activating, by the UE, power headroom reporting in response to the pathloss exceeding the threshold trigger value.

In an additional aspect of the disclosure, an apparatus configured for wireless communication, includes means for determining, by a UE, a time period since a last beam change of one or more serving beams received at the UE from a serving base station, means for measuring, by the UE, a pathloss of a beam-specific layer 3 reference signal on a current serving beam in response to the time period exceeding a minimum time threshold, and means for measuring, by the UE, the pathloss of a beam-specific layer 1 reference signal on the current serving beam in response to the time period being below the minimum time threshold.

In an additional aspect of the disclosure, a non-transitory computer-readable medium having program code recorded thereon. The program code further includes code to determine, by a UE, a beam specific periodic PHR in response to expiration of a first reporting timer, wherein the UE receives communications from a serving base station over one or more serving beams beamformed by the serving base station, code to transmit, by the UE, the beam-specific periodic PHR to the serving base station, code to detect, by the UE, a report triggering event, code to determine, by the UE, a UE-specific trigger PHR in response to the report triggering event and expiration of a second reporting timer, and code to transmit, by the UE, the UE-specific trigger PHR to the serving base station.

In an additional aspect of the disclosure, a non-transitory computer-readable medium having program code recorded thereon. The program code further includes code to receive, at a UE, an identification signal from a serving base station, wherein the identification signal identifies one or more reference signals for pathloss measurement, code to measure, by the UE, a pathloss on the one or more reference signals identified by the identification signal, code to compare, by the UE, the pathloss to a threshold trigger value, and code to activate, by the UE, power headroom reporting in response to the pathloss exceeding the threshold trigger value.

In an additional aspect of the disclosure, a non-transitory computer-readable medium having program code recorded thereon. The program code further includes code to determine, by a UE, a time period since a last beam change of one or more serving beams received at the UE from a serving base station, code to measure, by the UE, a pathloss of a beam-specific layer 3 reference signal on a current serving beam in response to the time period exceeding a minimum time threshold, and code to measure, by the UE, the pathloss of a beam-specific layer 1 reference signal on the current serving beam in response to the time period being below the minimum time threshold.

In an additional aspect of the disclosure, an apparatus configured for wireless communication is disclosed. The apparatus includes at least one processor, and a memory coupled to the processor. The processor is configured to determine, by a UE, a beam-specific periodic PHR in response to expiration of a first reporting timer, wherein the UE receives communications from a serving base station over one or more serving beams beamformed by the serving base station, to transmit, by the UE, the beam-specific periodic PHR to the serving base station, to detect, by the UE, a report triggering event, to determine, by the UE, a UE-specific trigger PHR in response to the report triggering event and expiration of a second reporting timer, and to transmit, by the UE, the UE-specific trigger PHR to the serving base station.

In an additional aspect of the disclosure, an apparatus configured for wireless communication is disclosed. The apparatus includes at least one processor, and a memory coupled to the processor. The processor is configured to receive, at a UE, an identification signal from a serving base station, wherein the identification signal identifies one or more reference signals for pathloss measurement, to measure, by the UE, a pathloss on the one or more reference signals identified by the identification signal, to compare, by the UE, the pathloss to a threshold trigger value, and to activate, by the UE, power headroom reporting in response to the pathloss exceeding the threshold trigger value.

In an additional aspect of the disclosure, an apparatus configured for wireless communication is disclosed. The apparatus includes at least one processor, and a memory coupled to the processor. The processor is configured to determine, by a UE, a time period since a last beam change of one or more serving beams received at the UE from a serving base station, to measure, by the UE, a pathloss of a beam-specific layer 3 reference signal on a current serving beam in response to the time period exceeding a minimum time threshold, and to measure, by the UE, the pathloss of a beam-specific layer 1 reference signal on the current serving beam in response to the time period being below the minimum time threshold.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
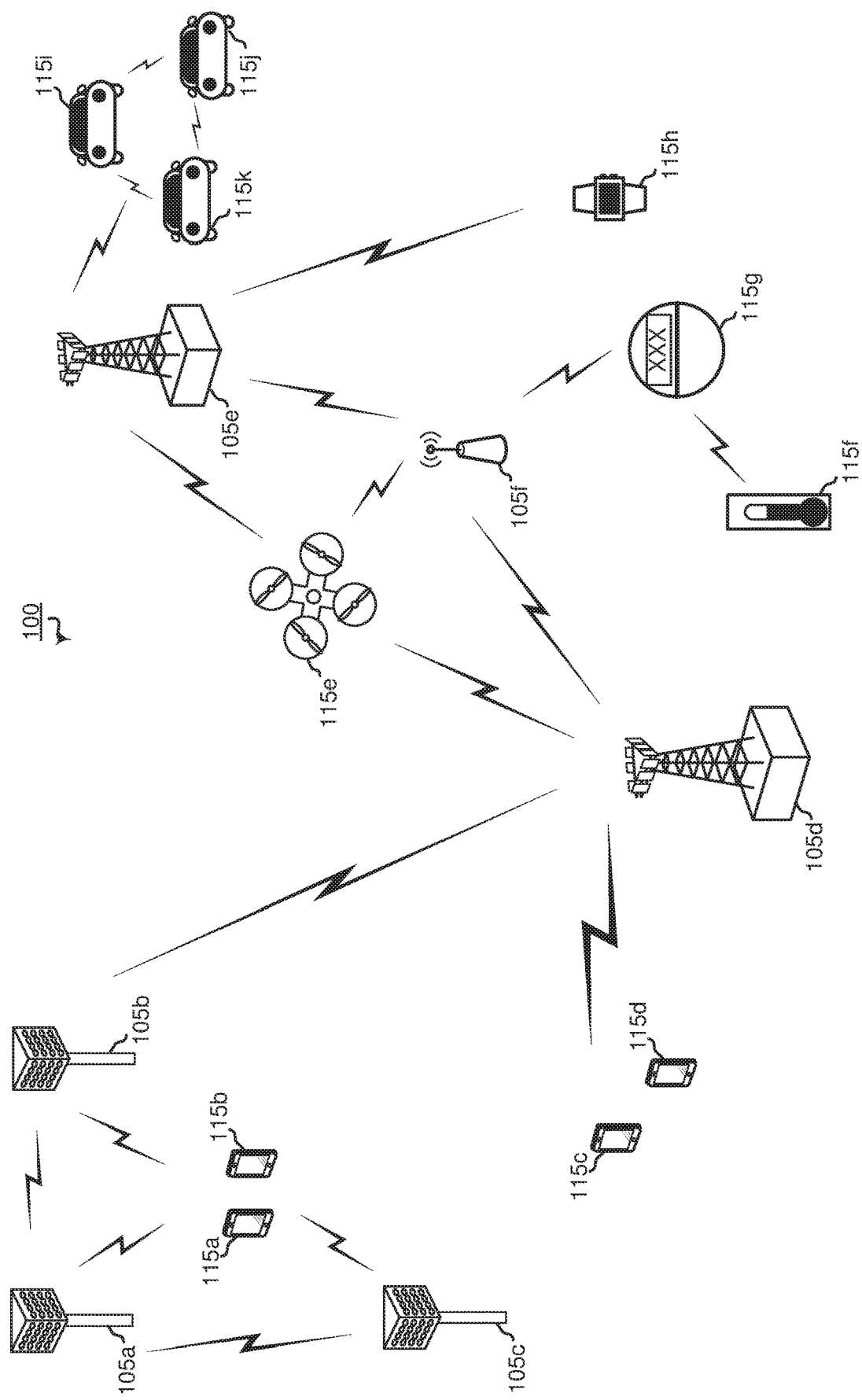
FIG. 1 is a block diagram illustrating details of a wireless communication system.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (TDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115*a*-115*d* are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
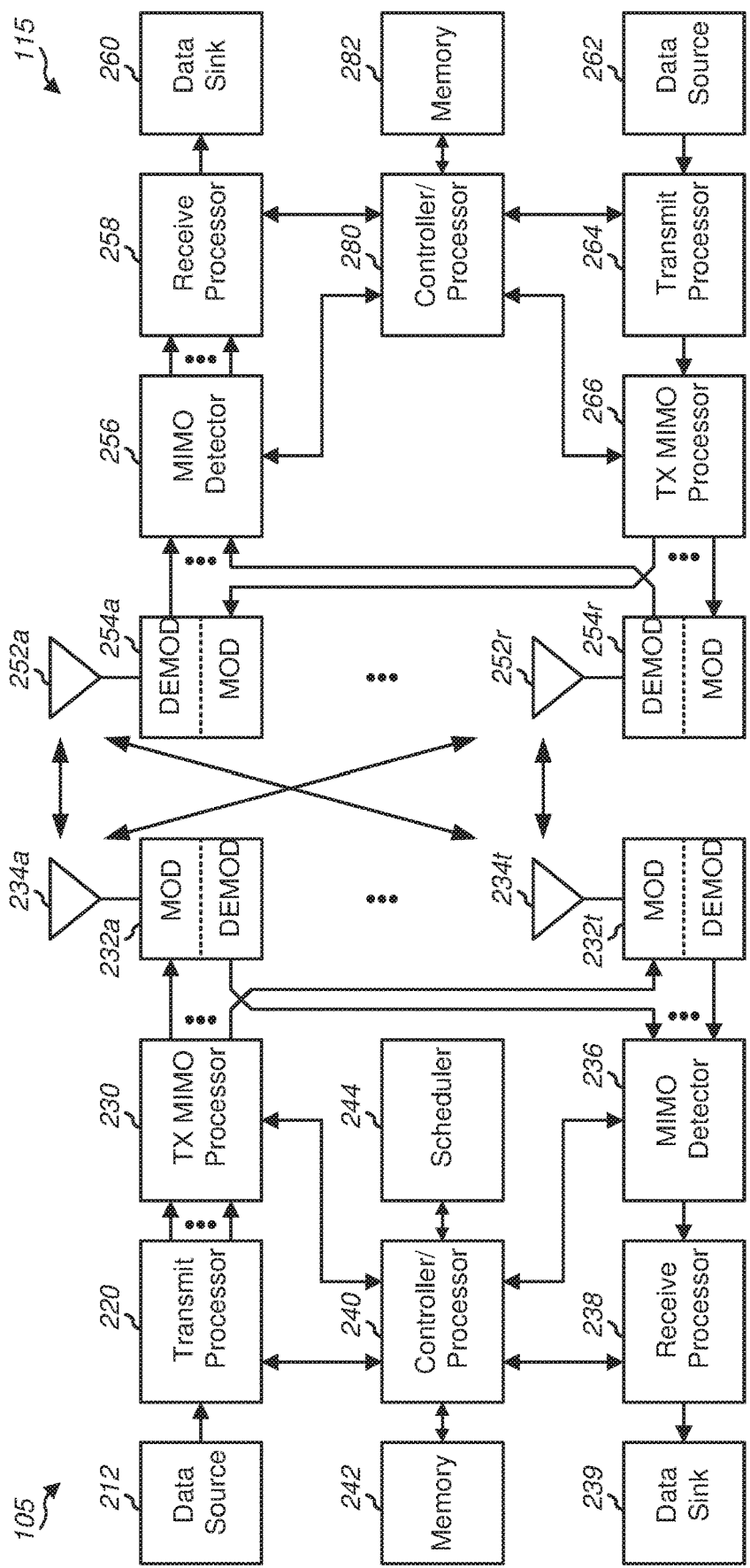
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data. symbols and control symbols, respectively. The transmit processor 220 may also generate reference symbols, e.g., for the primary synchronization signal (PSS), secondary synchronization signal (SSS), and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4, 7, and 8, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
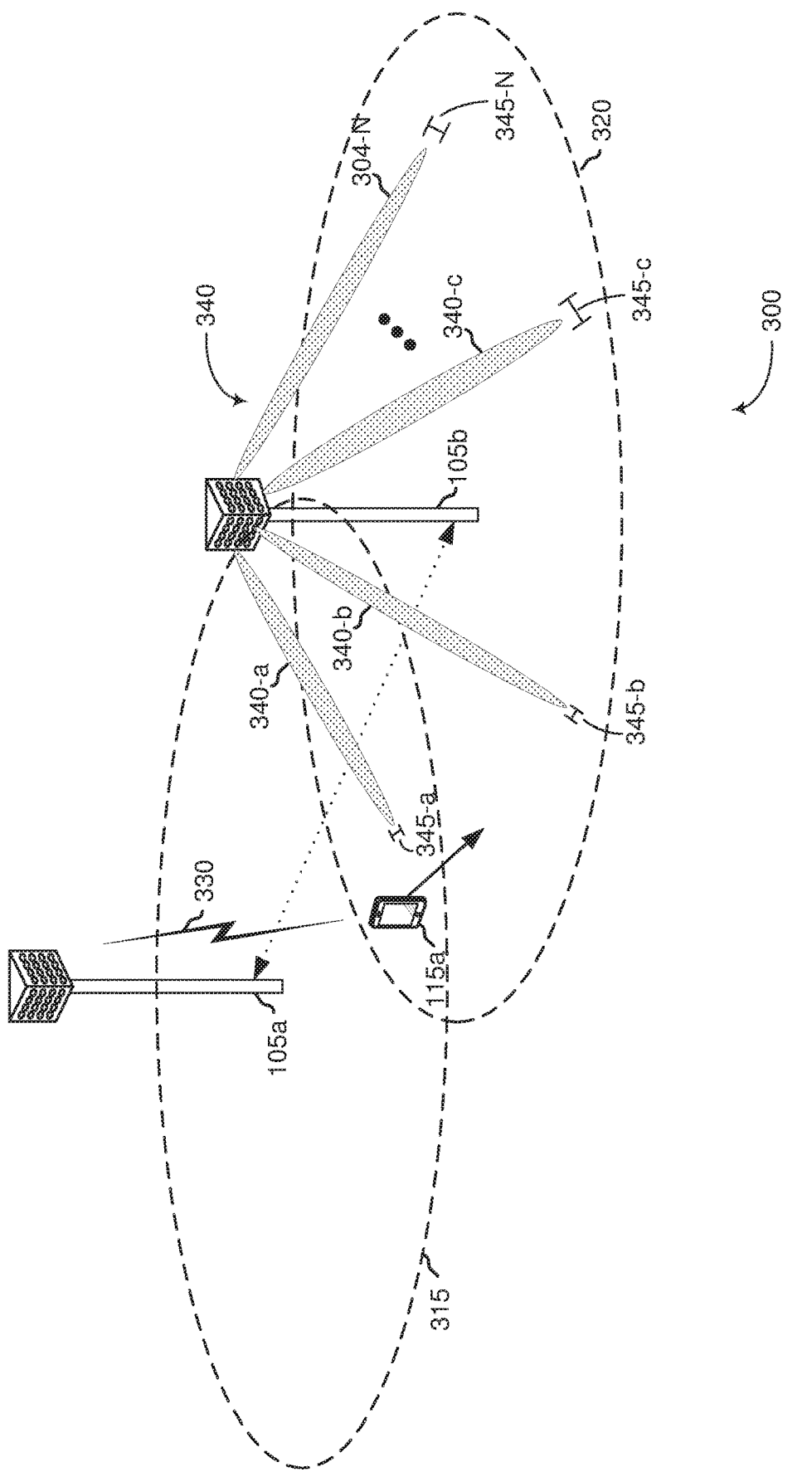
FIG. 3 is a block diagram illustrating a wireless communication system including base stations that use directional wireless beams.

FIG. 3 is a block diagram illustrating a wireless communication system 300 including base stations that use directional wireless beams. The wireless communication system 300 may be an example of the wireless communication system 100 discussed with reference to FIG. 1. The wireless communication system 300 includes a serving base station 305 and a target base station 310. Coverage areas 315, 320 may be defined for their respective base stations 305, 310. The serving base station 305 and the target base station 310 may be examples of the base stations 105 described with reference to FIG. 1. As such, features of the base stations 305, 310 may be similar to those of the base stations 105.

The serving base station 305 and the target base station 310 may communicate via a backhaul link 325. The backhaul link 325 may be a wired backhaul link or a wireless backhaul link. The backhaul link 325 may be configured to communicate data and other information between the serving base station 305 and the target base station 310. The backhaul link 325 may be an example of the backhaul links 134 described in reference to FIG. 1.

The serving base station 305 may establish a communication link 330 with a UE 115. The communication link 330 may be an example of the communication links 125 described with reference to FIG. 1. One characteristic of UEs 115 in a wireless communication system 300 is that the UEs 115 may be mobile. Because UEs 115 may change their geophysical location in the wireless communication system 300, to maintain connectivity, the UE 115 may desire to terminate its connection with the serving base station 305 and establish a new connection with a target base station 310. For example, as the UE 115 moves, the UE 115 may approach the limits of the coverage area 315 of the serving base station 305. At the same time, however, the UE 115 may have passed within the coverage area 320 of the target base station 310. In some examples, the UE 115 may determine a mobility parameter 335 of the UE 115. The mobility parameter 335 may indicate that the UE 115 is at a particular location, traveling in a particular direction, at a particular speed, other information related to the mobility of the UE 115, or any combination thereof. When the UE 115 approaches the limits of the coverage area 315 of the serving base station 305, a handover procedure of the UE 115 between the serving base station 305 and the target base station 310 may be initiated.

In some examples of new radio (NR), the target base station 310 may communicate with UEs 115 via directional wireless communication links 340 (sometimes 5 referred to as directional wireless beams or directional beams). The directional wireless communication links 340 may be pointed in a specific direction and provide high-bandwidth links between the target base station 310 and the UEs 115. Signal processing techniques, such as beamforming, may be used to coherently combine energy and thereby form the directional wireless communication links 340. Wireless communication links achieved through beamforming may be associated with narrow beams (e.g., "pencil beams") that are highly directional minimize inter-link interference, and provide high-bandwidth links between wireless nodes (e.g., base stations, access nodes, UEs etc.). In some examples, the target base station 310 may operate in millimeter wave (mmWave) frequency ranges, e.g., 28 GHz, 40 GHz, 60 GHz, etc. In some examples, the directional wireless communication links 340 are transmitted using frequencies greater than 6 GHz. Wireless communication at these frequencies may be associated with increased signal attenuation, e.g., path loss, which may be influenced by various factors, such as temperature, barometric pressure, diffraction, etc. Dynamic beam-steering and beam-search capabilities may further support, for example, discovery, link establishment, and beam refinement in the presence of dynamic shadowing and Rayleigh fading. Additionally, communication in such mmWave systems may be time division multiplexed, where a transmission may only be directed to one wireless device at a time due to the directionality of the transmitted signal.

Each directional wireless communication link 340 may have a beam width 345. The beam width 345 for each directional wireless communication link 340 may be different (e.g., compare the beam width 345-a of the directional wireless communication link 340-a to the beam width 345-c of the directional wireless communication link 340-c). The beam width 345 may related to the size of the phased array antenna used to generate the directional wireless communication link 340. Different beam widths 345 may be used by the target base station 310 in different scenarios. For example, a first message may transmitted/received using a directional wireless beam having a first beam width, while a second message may be transmitted/received using a directional wireless beam having a second beam width different than the first beam width. The target base station 310 may generate any number of directional wireless communication links 340 (e.g., directional wireless communication link 340-N). The directional wireless communication links 340 generated by the target base station 310 may be pointed at any geographic location.

As a UE 115 moves in the wireless communication system 300, the UE 115 may move out of the effective range of a particular directional wireless communication link (see, e.g., directional wireless communication link 340-a). Because of the narrow-beam width 345 of the directional wireless communication links 340, the directional wireless communication links 340 may provide coverage to a small geographic area. In contract, an omni-directional wireless communications link radiates energy in all directions and covers a wide geographic area.

When a target base station 310 uses directional wireless communication links 340 to establish a communication link with a UE 115, it may further complicate a handover procedure. In some examples, the handover procedure discussed herein is a non-contention handover procedure. Control messages exchanged during a handover procedure may have latency between transmission and receipt. As such, there may be a delay of time between when a target base station 310 assigns resources to the UE 115 and when the UE 115 may execute an operation using those assigned resources. In some examples, the handover procedure may have a latency that spans a few tens to hundreds of milliseconds. Due to UE mobility, rotation, or signal blockage, channel characteristics of a directional wireless communication link 340 may change over time. In particular, the channel characteristics of an assigned directional wireless communication link 340 may change during the delays of the handover procedure. If a single resource (e.g., a single directional wireless communication link 340) is assigned during a handover procedure, the handover procedure may fail due to insufficient signal later in the process. Accordingly, handover procedures may be adjusted to account for multiple directional wireless beams that may be used to establish a communication link between the target base station 310 and the UE 115 during a handover procedure.

In LTE, the UE power headroom report (PHR) control element may be used to report the power headroom available in the UE to a serving eNB. The power headroom of any given UE may be given by the following equation:

$$P_{CMAX} = P_{MAX} - MPR - AMPR \tag{1}$$

Where $P_{CMAX}$ corresponds to the total maximum UE transmit power, $P_{MAX}$ corresponds to the nominal UE maximum transmit power, MPR corresponds to the maximum power reduction (MPR) value, and AMPR corresponds to the additional MPR. In general, equation (1) identifies the difference between the nominal UE maximum transmit power and the estimated power for PUSCH transmission per activated serving cell. The eNB may then use this information for efficient link adaptation and scheduling.

The current PHR format includes 8 bits octave, in which the power headroom may be encoded in 6 bits with a reporting range from −23 dB to +40 dB in steps of 1 dB, while the remaining 2 bits are reserved. PHR may be transmitted at a subframe when the UE has uplink resources allocated for new transmissions. The PHR may be estimated over one subframe with a reporting delay of 0 ms, resulting in power headroom information being estimated and transmitted in the same subframe. The network may use this reported value to estimate how much uplink bandwidth a UE can use for a specific subframe. In general, the more resource blocks the UE is using, the higher the UE transmission power gets. However, the UE transmission power should not exceed the maximum transmission power of the UE. Therefore, a given UE would not be able to use much resource block (bandwidth) for uplink transmissions if it does not have enough power headroom.

The PHR can be configured either for periodic reporting or event threshold reporting, such as when the downlink pathloss has changed by a specific threshold amount. For periodic reporting, a report is triggered at the expiration of the periodic PHR timer, which can be configured with various values (e.g., between 10 ms and infinity). For threshold reporting, a PHR is triggered when the path loss changes by the predefined threshold amount (1, 3, 6 or infinite dB), provided that a second, configurable threshold reporting timer has also expired. The threshold reporting timer may start when a PHR has been transmitted and may have various time values (e.g., between 0 and 1000 ms). The threshold reporting timer also prevents wasting of resources by sending multiple PHR when a UE is experiencing rapidly changing pathloss conditions.

As the periodic PHR timer gets shorter, the power headroom can be more accurate. However, the shorter periodic timer also causes the UE to send more frequent PHR, thus, expending more transmission power. In order to address this trade-off, PHR reporting based on the changing pathloss threshold may be configured. In NR, both periodic reporting and event threshold-based reporting can be baseline as PHR triggering events.

The pathloss (PL) at a UE is generally measured from the difference between RSRP measurements and base station signalled transmission power information (that is transmission power of cell-specific reference signals (CRS)). In legacy LTE which uses omni-directional transmissions, it can be assumed that the pathloss may change relatively smoothly. However, in beamforming-based transmissions, because of the narrower bandwidth and directional nature of the beams, the measured pathloss may suddenly fluctuate with more frequent blockage as well as serving beam changes.

Blockage (NLOS—no line of sight) can be of greater significance in NR beamforming-based transmissions than in legacy LTE omni-directional transmissions. The directional line of sight (LOS) component accounts for a sizable percentage of the received power, and, thus, is a large part of reliable beamforming-based transmissions. LOS obstruction by objects such as buildings, brick and even human could lead to increased signal outages.

To handle blockage in beamforming-based transmissions, the network can trigger serving beam changes to change the serving beam based on the UE feedback of measured beam quality. A serving beam change may involve a sudden drop or rise in the received reference signal receive power (RSRP), reflecting the changes in pathloss and beamforming gain. The serving beam change may be based on a beam measurement event configured by a base station or on a beam measurement report from the UE. For the beam measurement event, the quality of another beam may become better than the serving beam by at least a threshold amount. The UE may change the serving beam when the RSRP of the target beam is higher than the serving beam. In the beam measurement report method, the base station decides the serving beam based on the measurement report and identifies the change of the serving beam to the UE. Before the beam change occurs to the target beam, the UE estimates the pathloss of the previous beam, while after the beam change, the UE will measure pathloss on the new serving beam.

In NR mmWave deployments, special issues may arise when applying legacy power control procedures. For example, beam quality may fluctuate more quickly, which may add uncertainty to the knowledge of available power at the UE side. Thus, during power adjustment, the serving beam pair may be changed quickly due to beam blockage. The current standards suggest a beam-specific power control, even though the legacy systems provide a UE-based power control. Such suggested beam-specific power control defines the possibility for beam-specific open and closed loop parameters. A given base station may be aware of the power headroom differences for different waveforms, if the UE can be configured for both waveforms.

In legacy LTE, measured pathloss (PL) is determined according to the following equation:

$$PL = \text{ReferenceSignalPower} - L3 \text{ filtered } RSRP \quad (2)$$

Where the layer 3 filtered RSRP is based on CRS and ReferenceSignalPower is provided by higher layers via system information broadcasts (e.g., SIB2). Several special issues may arise in NR deployments. For example, NR deployments may not typically transmit L3 CRS at a rate that would be frequent enough to provide RSRP quickly enough to address the fast beam changes. The more frequent reference signals in NR deployments include NR synchronization signals (NR-SS) and channel state information (CSI) reference signals (CSI-RS). NR-SS have been suggested for 5G NR networks as synchronization signals similar to the PSS/SSS/PBCH of LTE networks. As currently considered, NR-SS may be an always-on periodic signal. Thus, pathloss measurement in N, deployments could rely on either NR-SS or CSI-RS for performing the beam-specific RSRP measurements, instead of CRS. NR-SS and CSI-RS may have different beamforming gain, and CSI-RS may not even always be on. Therefore, in beam-specific power control operations, the issue arises over the use of L3 filtered beam RSRP vs. L1 filtered beam quality.

Additionally, in NR deployments, downlink beamforming gain may be largely different from uplink beamforming gain. This could occur because downlink and uplink transmissions may use different antenna panels. Moreover, different beam patterns may be used to adapt different interference environments for downlink and uplink transmissions, as well as circumstances in which the downlink associated base station may be different from the uplink associated base station (which may also be an issue in some LTE networks).

As noted above, legacy PHR reporting in LTE is generally UE-specific. However, the standards for NR network deployments has suggested that beam-specific power control be used. For example, during power adjustment, the beam pair may be changed (beam change) due to beam blockage. A UE-specific approach may not result in accurate operations, because a base station may not be certain which beam's PHR the UE is reporting when beam changing occurs. It has further been observed that, in beamforming deployments, such as NR mmWave operations, a beam energy change of up to 15 dB may be experienced between the best beam and the next best beam of the set of serving beams. Thus, relying on the PHR of the wrong beam in scheduling and link adaptation may result in a diminished communications experience. Moreover, considering such a large difference in beam energy, PHR reporting and event triggering become coupled issues, as the PHR event trigger in legacy LTE systems is also not beam-specific. Accordingly, various aspects of the present disclosure are directed to power control procedures having beam-specific periodic PHR reporting plus UE-specific event threshold PHR reporting.

Figure 4:
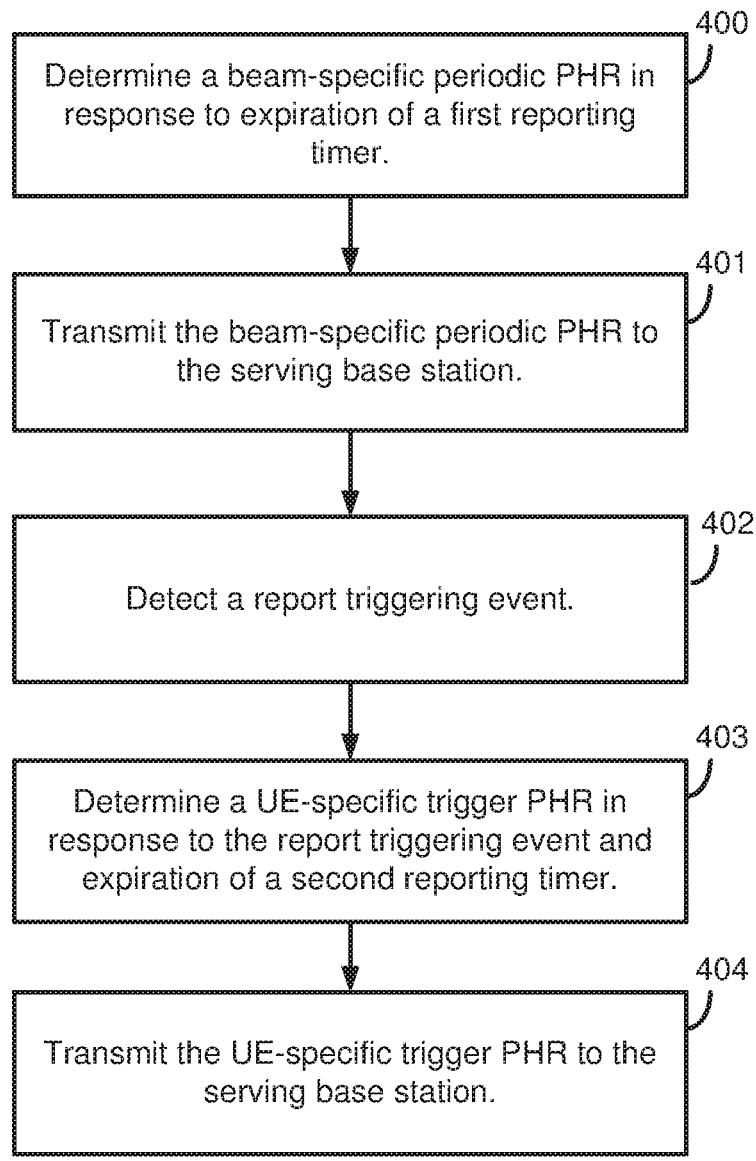
FIG. 4 is a block diagram illustrating example blocks executed to implement one aspect of the present disclosure.
Figure 9:
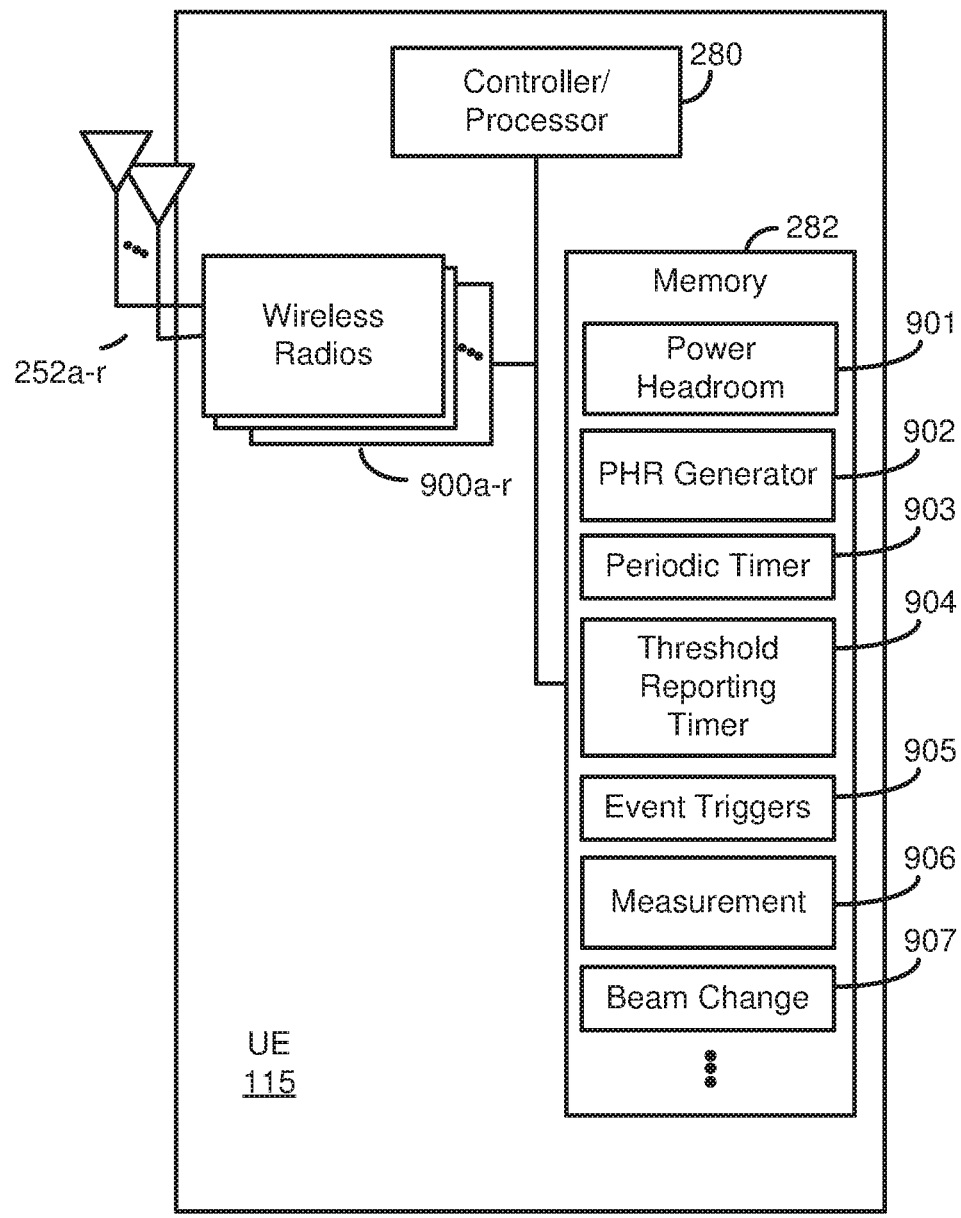
FIG. 9 is a block diagram illustrating an configured according to one aspect of the present disclosure.

FIG. 4 is a block diagram illustrating example blocks executed to implement one aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for eNB 105, including modulator/demodulators 254a-r, MIMO detector 256, receive processor 258, transmit processor 264, and TX MIMO processor 266.

At block 400, a UE determines a beam-specific periodic PHR in response to expiration of a first reporting timer. For example, UE 115, under control of controller/processor 280, executes periodic timer 903, stored in memory 282. Periodic timer 903 counts between times when UE 115 will send a beam-specific PHR to the serving base station. On expiration of periodic timer 903, UE 115 executes power headroom logic 901, stored in memory 282. The execution environment of power headroom logic measures the power headroom associated with the currently serving one or more beams. UE 115 then executes PHR generator 902 to generate the periodic PHR. At block 401, the UE transmits the beam-specific PHR to the serving base station. With the periodic reporting, when the periodic timer expires, UE 115 would report a beam-specific periodic PHR via wireless radios 900a-r and antennas 252a-r. This may be accomplished in a number of ways. For example, UE 115 may determine the power headroom for each of the serving beams and transmit the aggregate PHR that includes the power headroom for all of the beams. Alternatively, UE 115 may be scheduled by the base station to measure and report the PHR for each of the serving beams in different slots or at different times.

At block 402, the UE detects a report trigger event. UE 115, under control controller/processor 280, accesses event triggers 905, stored in memory 282. UE 115 may determine what events will trigger the event-trigger PHR. The report trigger event may include detecting the change in pathloss of the current serving beam by a predetermined amount. For example, UE 115 would execute measurement logic 906, stored in memory 282, to measure and maintain the pathloss of the serving beam. Additionally, a report trigger event may be defined for beam changes. Thus, UE 115 would execute beam change logic 907, stored in memory 282, to keep track of any beam changes that may occur at UE 115. At block 403, the UE determines a UE-specific trigger PHR in response to the report triggering event and expiration of a second timer, and, at block 404, transmits the UE-specific trigger PHR to the serving base station. If a pathloss change is detected using measurement logic 906, beyond that predetermined amount, as may be stored at event triggers 905, or a beam change occurs, as tracked by the execution environment of beam change logic 907, UE 115 accesses threshold reporting timer 904, stored in memory 282, to determine whether threshold reporting timer 904 has expired. If both the event is detected and threshold reporting timer 904 have expired, UE 115 will determine a UE-specific PHR by executing PHR generator 902. The UE-specific PHR could be either for only the current serving beam or could be for all of the serving beams. UE 115 will then transmit the UE-specific PHR via wireless radios 900a-r and antennas 252a-r.

Figure 5:
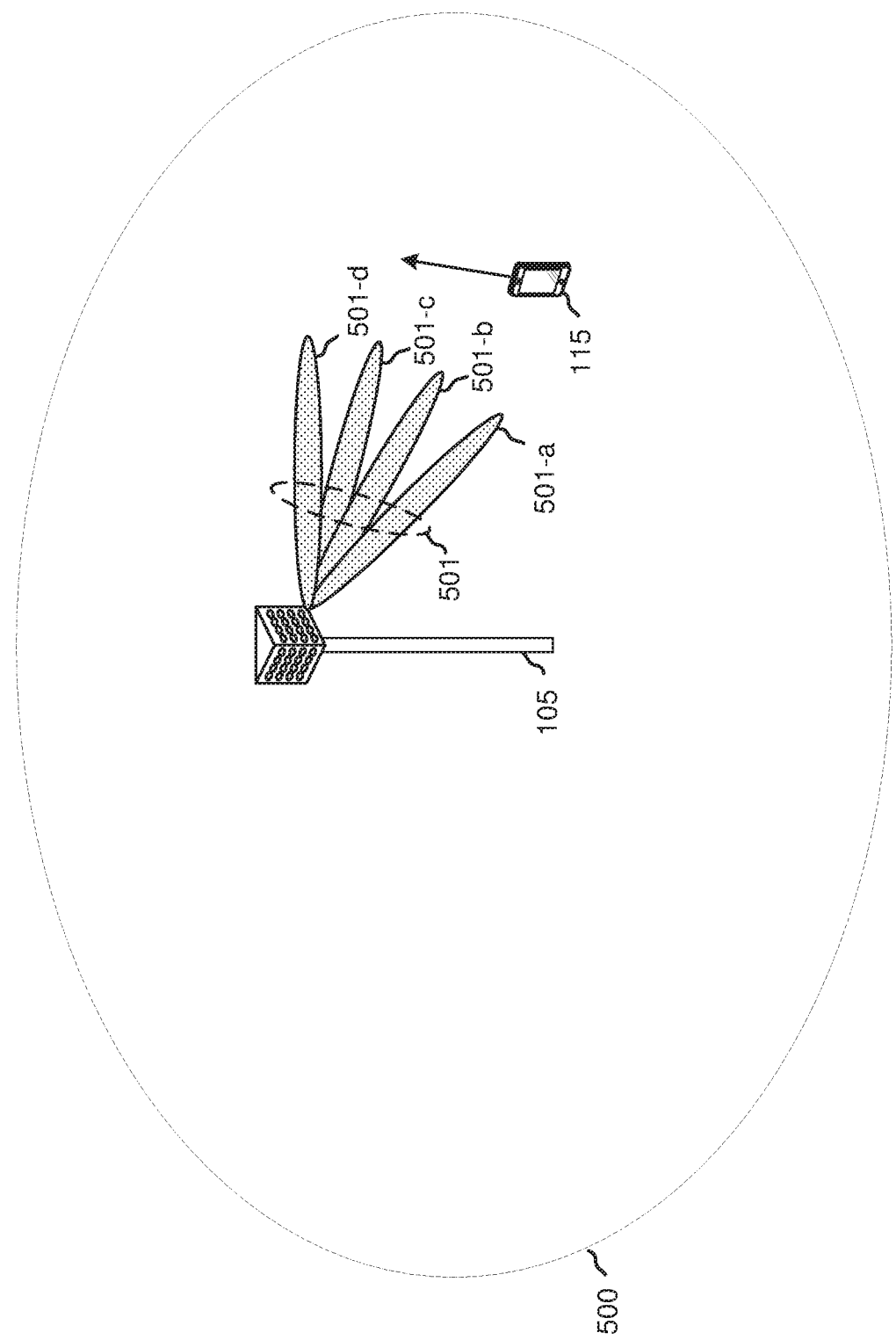
FIG. 5 is a block diagram illustrating a base station communicating with a UE using mmWave beamforming, in which the base station and UE are configured according to aspects of the present disclosure.

FIG. 5 is a block diagram illustrating a base station 105 communicating with UE 115 using mmWave beamforming, in which base station 105 and UE 115 are configured according to aspects of the present disclosure. UE 115 is in motion within coverage area 500 of base station 105. In serving UE 115, base station 105 beam forms a set of serving beams 501. While each serving beams 501 is a serving beam, there may be only one of serving beams 501-a-501-d actually serving UE 115 at a given time. As UE 115 moves across coverage area 500, the quality of the current serving beam may change or the current serving beam may be blocked, causing UE 115 to beam change to the best of the set of serving beams 501. As noted, the because of the beamforming by base station 105, there may be a beam energy change of up to 15 dB between the best beam and the next best beam of the set of serving beams 501. In one example of operation, after expiration of the periodic PHR timer, UE 115 may determine power headroom and transmit a PHR to base station 105.

In one possible scenario, UE 115 may reuse the legacy LTE PHR reporting by reporting only one periodic PHR for current serving beam. For example, if, at the expiration of the periodic PHR timer, UE 115 is currently served by serving beam 501-b, UE 115 will calculate the power headroom of serving beam 501-b and transmit it in a PHR to base station 105. Base station 105 estimate the other beams' PHR based on an estimation for beamforming gain difference in UE 115, based on the same nominal UE maximum transmit power ($P_{MAX}$). However, in such a possible scenario, the serving beam may change over the periodic PHR timer. Therefore, base station 105 may not have a timely PHR for the alternative beams.

Figure 6A:
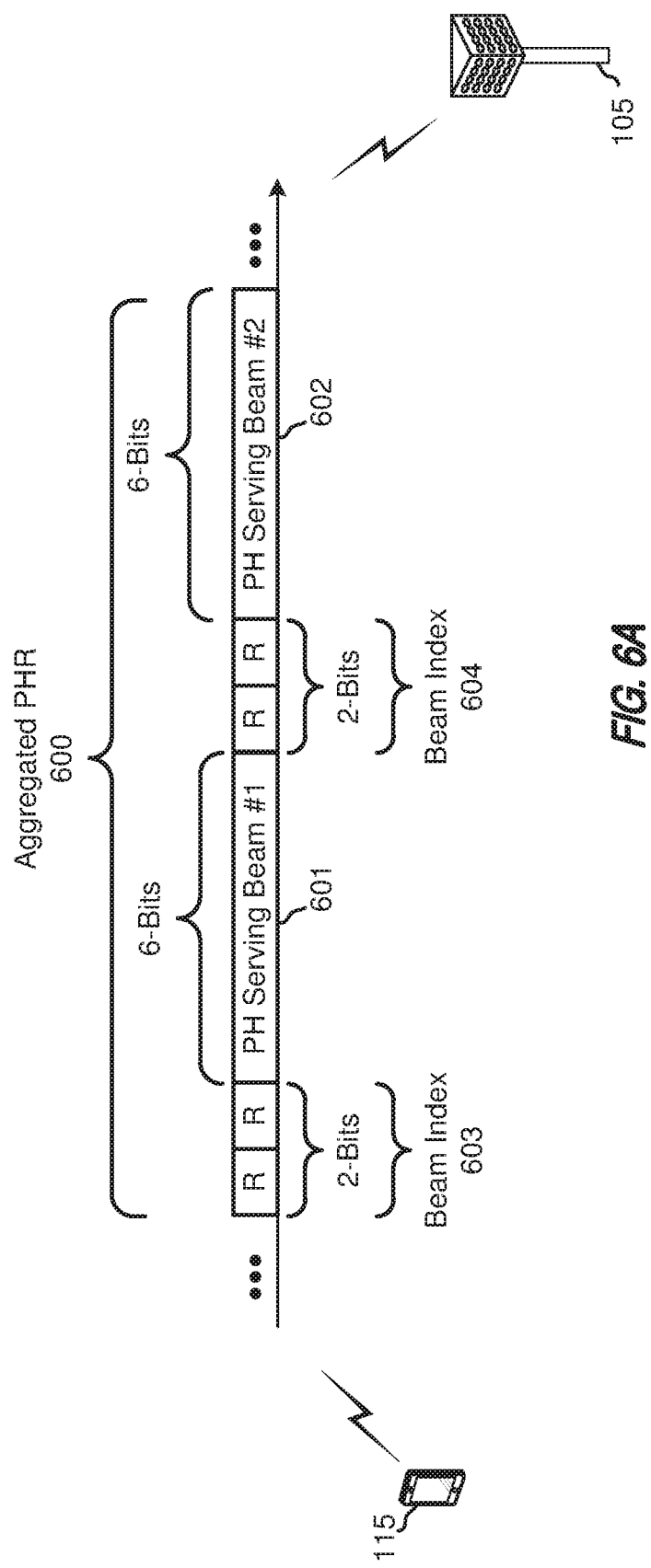
FIGS. 6A-6C are block diagrams illustrating a base station and UE configured according to aspects of the present disclosure.

FIG. 6A is a block diagram illustrating base station 105 and UE 115 configured according to one aspect of the present disclosure. When UE 115 transmits the periodic PHR to base station 105 (FIG. 5), it may transmit one periodic PHR that includes the power headroom information of all serving beams. A typical PHR is formatted as an octet, with a 6-bit power headroom and two reserved bit. When transmitting one periodic PHR that includes power headroom information for all of the serving beams, an aggregated PHR 600 is generated. UE 115 aggregates the 6-bit power headroom information 601 for beam #1 with the 6-bit power headroom information 602 for beam #2 into aggregated PHR. 600. The two reserved bits may further be used by UE 115 to identify which of the beams the PHR goes with, Thus. beam index 603 identifies beam #1 while beam index 604 identifies beam #2. Base station 105 would then be able to identify which beam the PHR information belongs to.

Figure 6B:
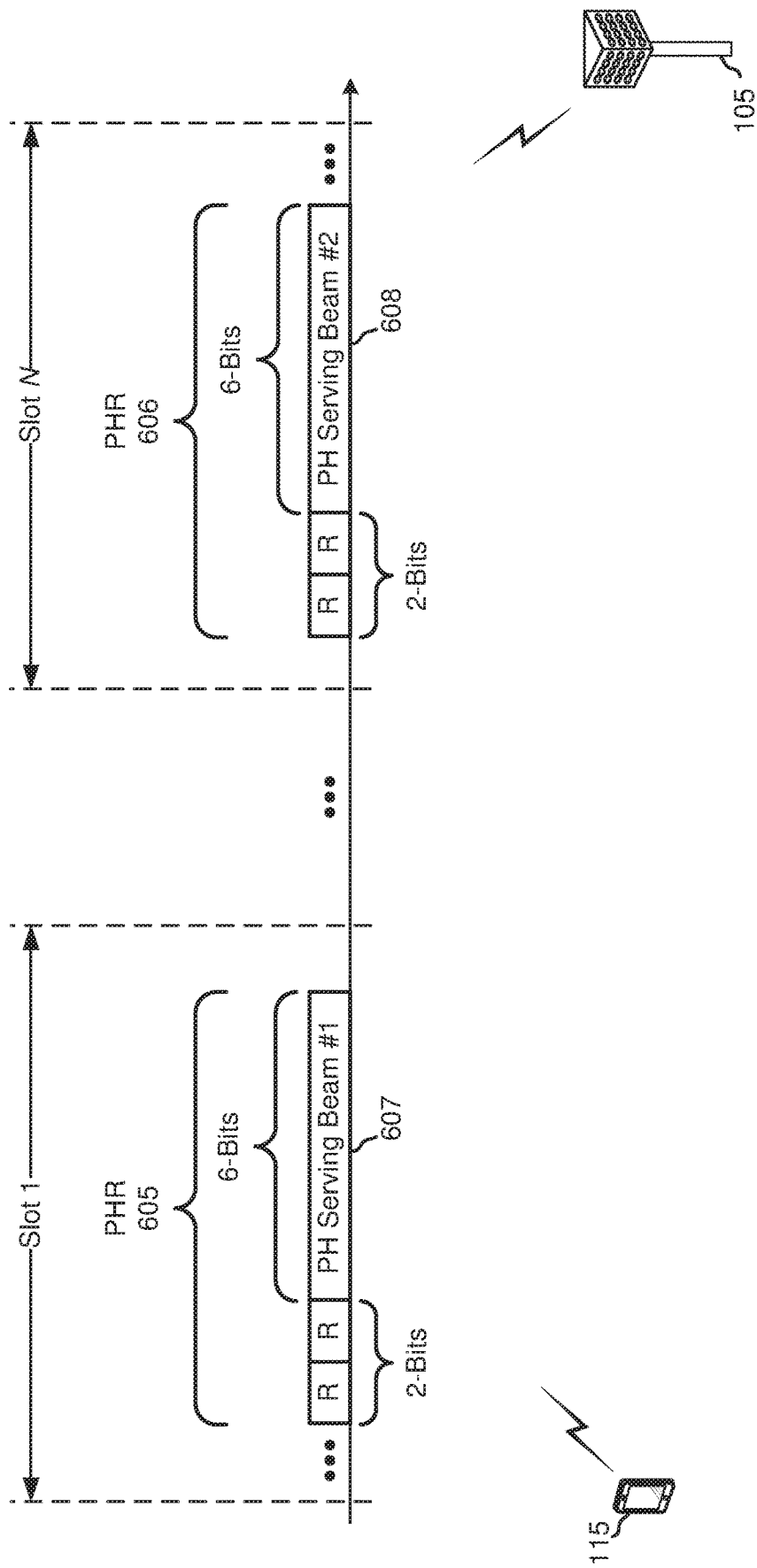

FIG. 6B is a block diagram illustrating base station 105 and UE 115 configured according to another aspect of the present disclosure. PHR reporting according to the aspect illustrated in FIG. 6B reuses the legacy LTE. However, base station 105 configures UE 115 to measure and report PHR at different a period and/or at an offset for the different beams of the set of serving beams. UE 115 is configured to report PHR 605, including the power headroom information 607 for beam #1, at slot 1, and is configured to report PHR 606, including power headroom information 608 for beam #2, at slot N. Therefore, over the course of transmissions by UE 115, base station 105 will receive the PHR for each of the beams in the set of serving beams.

It should be noted that, such aspects may only work for periodic reference signals, such as CSI-RS and NR-SS. Moreover, a new periodical PHR trigger may be configured for a set of beams, where each configuration includes both a period and/or an offset for determining and reporting the PHR for each serving beam in different reports or slots.

Referring back to FIG. 5, an additional aspect that may be illustrated by FIG. 5 include PHR reporting based on an event trigger. For example, an event trigger may be the change in pathloss of a serving beam that exceeds a predetermined threshold. In the presently described example, the legacy LTE procedures are reused by UE 115 in reporting one PHR when the measured pathloss of the current serving beam exceeds the predetermined threshold and expiration of a threshold reporting timer. As noted, the threshold reporting timer prevents UE 115 from reporting PHR to frequently when UE 115 is experiencing rapid changes in pathloss. Thus, when UE 115 calculates a change in pathloss of the current serving beam, beam 501-a, that exceeds the threshold level, UE 115 checks threshold reporting timer to determine if the timer has expired. If the timer has expired, UE 115 will calculate the power headroom and generate the PHR to report to base station 105. Otherwise, if the threshold reporting timer has not expired, UE 115 will not generate a PHR, but, instead, continue operations. If, when the threshold reporting timer does expire, and the measured pathloss change at the expiration still exceeds the threshold level, UE 115 will generate and transmit a PHR for base station 105.

In the currently-described example aspect, the pathloss threshold and threshold reporting timer may apply across the set of serving beams 501. Thus, in the presently-described aspect, the pathloss threshold and threshold reporting timer will be common to UE 115 for all serving beams. For example, if UE 115 experiences an NLOS blockage of serving beam 501-a and determines to beam change to serving beam 501-b, threshold reporting timer will continue without reset, in addition to the same pathloss threshold and any other protocol variable being the same for serving beam 501-b.

With event-trigger PHR procedures, UE 115 may report a single PHR to base station 105, as in the legacy LTE procedures. The single PHR implies that the event-triggered PHR calculated and transmitted by UE 115 to base station 105 does not distinguish beams. The beam-specific PHRs would, instead, be reported by UE 115 during the periodic PHR reporting. Two sub-solutions for PHR reporting. Alt-1-a: report just one PHR (same as LTE). It implies that prohibit PHR does not distinguish beams (assuming that beam-specific PHR is reported in periodical PHR).

In an alternative of the presently-described aspect, UE 115 may report a single PHR to base station 105 that includes the power headroom information for all of the serving beams. For example, referring back to FIG. 6A, in the presently-described aspect, aggregated PHR 600 corresponds to the event-trigger PHR, with the power headroom information 601 for beam #1 and the power headroom information 602 for beam #2. Similar to the periodic PHR procedure described previously for FIG. 6A, event-trigger version of aggregated PHR 600 includes beam indices 603 and 604 in the reserved 2-bit location of the PHR octet that identifies to base station 105 which beam power headroom information 601 and 602 applies to.

As noted, the legacy LTE event-trigger PHR reporting procedures include pathloss change threshold values ranging from 1, 3, and 6 dB. However, aspects of the present disclosure operated in 5G mmWave deployments may not properly trigger based on the pathloss changes that may be observed with mmWave beamforming (e.g., approximately 15 dB). In order to accommodate the larger potential pathloss change in mmWave beamforming deployments, aspects of the present disclosure may change the legacy pathloss threshold to at least 15 dB. Thus, referring back to FIG. 5, if UE 115 detects a pathloss on serving beam 501-a that meets the 15 dB pathloss threshold, UE 115 will trigger calculation and transmission of an event-trigger PHR for base station 105.

Additional aspects of the present disclosure may add new trigger events to the event-trigger PHR reporting procedures. In one such example, serving beam change may be identified as an event trigger for UE 115. Referring again to FIG. 5, in the presently-described additional aspect, UE 115 experiences NLOS blockage of current serving beam 501-a and selects to beam change to beam 501-b. Upon selecting to beam change, UE 115 checks the threshold reporting timer to determine if it has expired. If so, then UE 115 will calculate the power headroom on beam 501-b and generate a event-trigger PHR for base station 105 with the power headroom information.

Figure 6C:
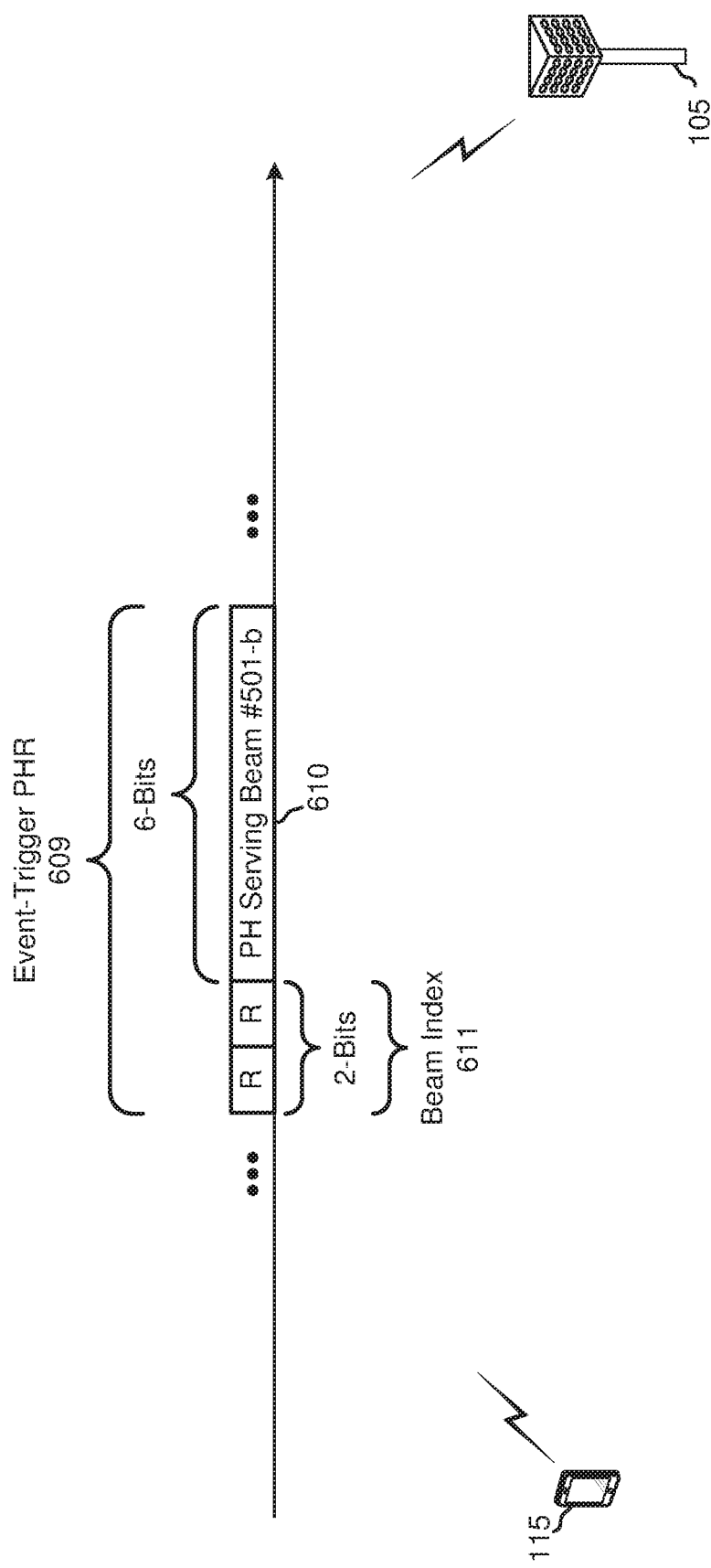

FIG. 6C is a block diagram illustrating base station 105 and UE 115 configured according to another aspect of the present disclosure. When UE 115 selects the beam change to serving beam 501-b (FIG. 5), it calculates power headroom information 610 for serving beam 501-b and includes it in event-trigger PHR 609. In order to inform base station 105 which beam power headroom information 610 corresponds to, the 2-bit reserve of the PHR octet may include beam index 611, which identifies serving beam 501-b. Because the beam change is configured as an event trigger, the threshold reporting timer and protocol variables should be reset when such an event is detected. Thus, the timers and protocol variables of the presently-described example aspect are maintained per beam and not per UE.

It should be noted that, in the presently described example, the pathloss threshold value may not need to be extended to the higher potential pathloss change that may be experienced in mmWave beamforming. Such high levels of potential pathloss are generally associated with the different beams of the set of serving beams. Thus, when beam change is already an event trigger, the pathloss threshold value may not need to reflect the larger value for mmWave beamforming in such aspects base station 105 and UE 115 would have no ambiguity on the serving beam, as the beam switch is robust.

It should be noted that additional or alternative aspect may provide for beam-specific event-trigger PHR from UE 115, where base station 105 configures UE 115 to monitor multiple serving beam's PHRs in different slots. In such aspects, base station 105 would receive event-trigger PHR for additional serving beams in the different configured slots. This multiple serving beam PHR procedure may work efficiently using periodic CSI-RS or NR-SS. Such aspects would include new event-trigger PHR configurations for a set of beams, where each includes different periods and/or offsets. Separate timers and protocol variables may be maintained per beam, without necessity to extend the pathloss threshold range to the higher levels observed in mmWave beamforming.

The various aspects of the present disclosure provide for power control processes for mmWave beamforming deployments including both periodic PHR reporting and event-trigger PHR reporting. Pathloss estimation is performed for determining certain trigger events. However, as indicated previously, the nature of mmWave beamforming potentially creates issues in extending the legacy LTE PHR reporting procedures, as the omni-directional CRS may not be adequate to efficiently measure or estimate pathloss in rapidly changing directional beams.

Additional aspects of the present disclosure may provide for reference signals that may address the issues in mmWave beams. In one example implementation, CSI-RS are configured as the baseline reference signal for pathloss estimation in mmWave beamforming. CSI-RS may provide more accurate pathloss estimates because the UE would be in a connected-mode and, thus, calculations on the CSI-RS would include downlink beamforming gain in the pathloss estimation.

Further aspects of the present disclosure may additionally provide for NR-SS as the reference signal for pathloss estimation. If NR-SS may be used in addition to CSI-RS, a serving base station may indicate which of these reference signals should be used for pathloss estimation through dedicated signaling.

Figure 7:
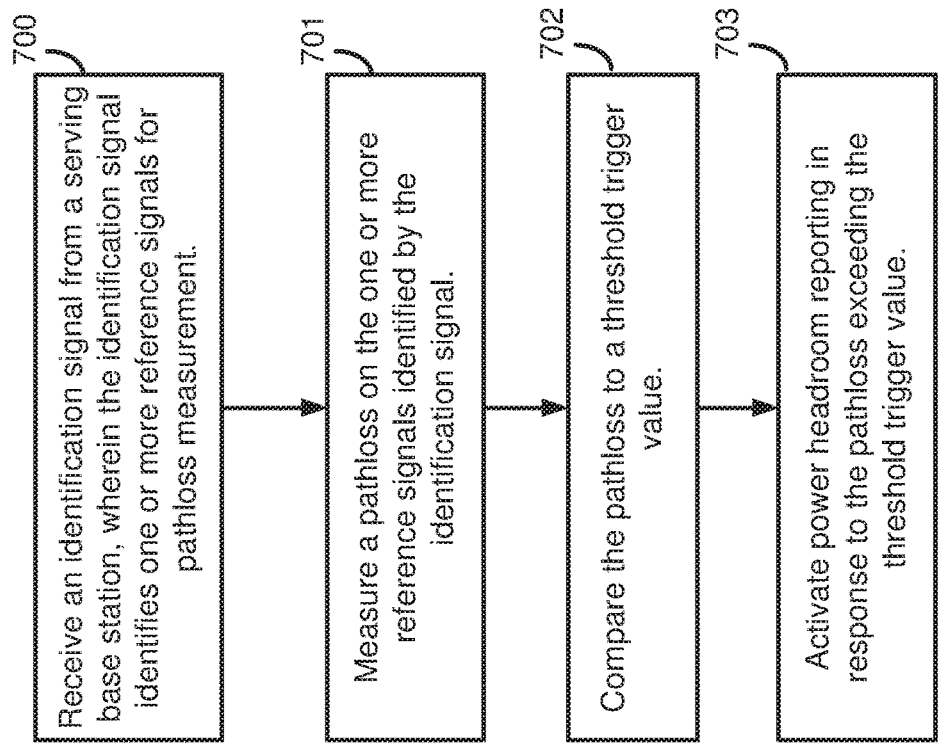
FIG. 7 is a block diagram illustrating example blocks executed to implement one aspect of the present disclosure.

FIG. 7 is a block diagram illustrating example blocks executed to implement one aspect of the present disclosure. The example blocks will also be described with respect to the detail of UE 115 in FIG. 9. At block 700, a UE receives an identification signal from a serving base station that identifies one or more reference signals for pathloss measurement. The identification signal received by UE 115 may be included in power control configuration information received via antennas 252*a-r* and wireless radios 900*a-r* and identify to UE 115 whether CSI-RS or NR-SS are to be used for pathloss estimation. Such power control configuration information may be signaled at least semi-statically (e.g., radio resource control (RRC) or media access control (MAC) control element (MAC-CE)). Due to potential large beamforming gain difference between different beams, the identification signal may also indicate to the UE which subset of CSI-RS to measure for pathloss estimation.

It should be noted that the indicated CSI-RS may be periodic, semi-periodic, or aperiodic CSI-RS.

At block 701, the UE measures a pathloss on the one or more reference signals identified by the identification signal. For example, UE 115 executes measurement logic 906 to measure the pathloss of the identified reference signals (NR-SS, CSI-RS, or a designated subset of CSI-RS) The UE, at block 702, compares the measured pathloss to a threshold. trigger value. Under control of controller/processor 280, UE 115 compares the measured pathloss against the threshold trigger value stored at event triggers 905. If the measured pathloss exceeds the threshold trigger value, then, at block 703, activates power headroom reporting. Thus, if the measured pathloss exceeds the event trigger, UE 115 will execute power headroom logic 901 and PHR generator 902 to measure the power headroom and send the PHR to the serving base station. According to the presently-described aspect, dedicated signaling is used by the base station to signal UE 115 which reference signals to use for pathloss estimation in the mmWave beamforming deployment.

While dedicated signaling may be used to identify the appropriate reference signals for pathloss estimation, issues may arise based on a mismatch between uplink and downlink beamforming gain. As indicated above, such a mismatch may occur because downlink and uplink transmissions use different antenna panels. Different beam patterns may also be used to adapt different interference environments for downlink and uplink transmissions, as well as scenarios in which the base station associated with downlink may be different from the base station associated uplink transmissions.

To address the mismatch, in one example aspect, the UE may reuse the legacy LTE pathloss estimation, in which the beam mismatch may be compensated for by the base station through implementation. While the compensation may improve the mismatch, it may be difficult for the base station to estimate UE receive beamforming gain if UE receiver beamforming applies.

In an additional aspect of the present disclosure, in order to address the mismatch issue, a beam-specific pathloss offset may be added to the dedicated signaling from the base station to the UE. Beam-specific pathloss offset corresponds to the downlink beamforming gain minus the uplink beamforming gain. If UE receiver beamforming is applied, the UE could add offset attributable to UE receive beamforming gain.

It should be noted that, in order to address the mismatch between uplink and downlink beamforming gain, a UE may reuse the legacy LTE pathloss estimation with the UE compensating for the beam mismatch through implementation. While no specification changes would be required in such an option, it may be difficult for a UE to estimate the difference in beamforming gain between uplink and downlink without more detailed signaling exchanges with the serving base station.

Figure 8:
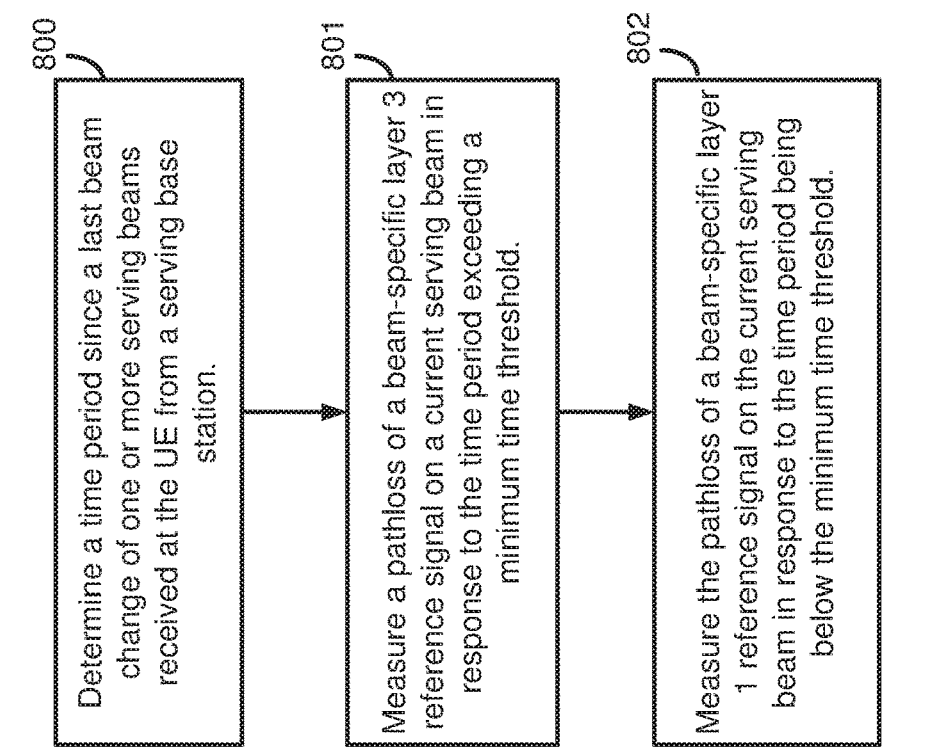
FIG. 8 is a block diagram illustrating example blocks executed to implement one aspect of the present disclosure.

FIG. 8 is a block diagram illustrating example blocks executed to implement one aspect of the present disclosure. The example blocks will also be described with respect to the detail of UE 115 in FIG. 9. At block 800, a UE determines a time period since a last beam change of one or more serving beams received at the UE from a serving base station. For example, UE 115 executes beam change logic 907 to determine the time period since the last beam change. At block 801, the UE measures a pathloss of a beam-specific layer 3 reference signal on a current serving beam in response to the time period exceeding a minimum time threshold. When beam changes do not occur too frequently, use of beam-specific layer 3 reference signals for pathloss estimation by UE 115 may be sufficient. UE 115, under control of controller/processor 280, would execute measurement logic 906 to determine the pathloss estimation. At block 802 the UE measures the pathloss of a beam-specific layer 1 reference signal on the current serving beam in response to the time period being below the minimum time threshold. When beam changing occurs more rapidly, the layer 3 signaling may not occur often enough to sufficiently provide UE 115 the signal for pathloss estimation. The layer 1 signaling would be preferable in order to address the more frequent and beam-specific aspects of mmWave transmissions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The present disclosure comprises a first aspect, such as a non-transitory computer-readable medium having program code recorded thereon, the program code comprising:

program code executable by a computer for causing the computer to determine, by a user equipment (UE), a beam-specific periodic power headroom report (PHR) in response to expiration of a first reporting timer, wherein the UE receives communications from a serving base station over one or more serving beams beamformed by the serving base station;

program code executable by the computer for causing the computer to transmit, by the UE, the beam-specific periodic PHR to the serving base station;

program code executable by the computer for causing the computer to detect, by the UE, a report triggering event;

program code executable by the computer for causing the computer to determine, by the UE, a UE-specific trigger PHR in response to the report triggering event and expiration of a second reporting timer;

program code executable by the computer for causing the computer to transmit, by the UE, the UE-specific trigger PHR to the serving base station.

Based on the first aspect, the non-transitory computer-readable medium of a second aspect, wherein the program code executable by the computer for causing the computer to determine the beam-specific periodic PHR includes:

program code executable by the computer for causing the computer to measure a power headroom for each beam of the one or more serving beams; and program code executable by the computer for causing the computer to generate an aggregate PHR including the power headroom for the each beam;

wherein the program code executable by the computer for causing the computer to transmit the beam-specific periodic PHR includes program code executable by the computer for causing the computer to transmit the aggregate PHR.

Based on the second aspect, the non-transitory computer-readable medium of a third aspect, wherein the program code executable by the computer for causing the computer to generate further includes:

program code executable by the computer for causing the computer to add a beam identifier to the aggregate PHR, wherein the beam identifier indicates an associated beam of the one or more serving beams corresponding to the power headroom of the aggregate PHR.

Based on the first aspect, the non-transitory computer-readable medium of a fourth aspect, further including:

program code executable by the computer for causing the computer to receive, at the UE, beam reporting configuration from the serving base station, wherein the beam reporting configuration configures the UE to report the beam-specific periodic PHR for each of the one or more serving beams at a different reporting occasion, wherein the program code executable by the computer for causing the computer to determine the beam-specific periodic PHR includes program code executable by the computer for causing the computer to determine the beam-specific periodic PHR of a currently-scheduled beam of the one or more serving beams, and wherein the program code executable by the computer for causing the computer to transmit the beam-specific periodic PHR includes program code executable by the computer for causing the computer to transmit the beam-specific periodic PHR of the currently-scheduled beam at a currently-scheduled reporting occasion.

Based on the fourth aspect, the non-transitory computer-readable medium of a fifth aspect, wherein the beam reporting configuration includes one of:

a different period of the first reporting timer for each of the one or more serving beams; or a different offset to the first reporting tinier for each of the one or more serving beams.

Based on the first aspect, the non-transitory computer-readable medium of a sixth aspect, wherein the program code executable by the computer for causing the computer to determine the UE-specific trigger PHR includes program code executable by the computer for causing the computer to measure a power headroom for a current serving beam of the one or more serving beams, wherein the UE-specific trigger PHR includes the power headroom for the current serving beam.

Based on the first aspect, the non-transitory computer-readable medium of a seventh aspect, wherein the program code executable by the computer for causing the computer to determine the UE-specific trigger PHR includes:

program code executable by the computer for causing the computer to measure a power headroom for each beam of the one or more serving beams; and program code executable by the computer for causing the computer to generate an aggregate trigger PHR including the power headroom for the each beam;

wherein the program code executable by the computer for causing the computer to transmit the UE-specific trigger PHR includes program code executable by the computer for causing the computer to transmit the aggregate trigger PHR.

Based on the first aspect, the non-transitory computer-readable medium of an eighth aspect, wherein the second reporting tinier and threshold trigger value of the report triggering event are common to the UE and shared across the one or more serving beams, such that a serving beam change does not trigger restart of the second reporting timer.

Based on the first aspect, the non-transitory computer-readable medium of a ninth aspect, wherein the report triggering event includes one or more of:

a pathloss measured on a current serving beam of the one or more serving beams; and a serving beam change at the UE.

Based on the ninth aspect, the non-transitory computer-readable medium of a tenth aspect, further including:

program code executable by the computer for causing the computer to reset the second reporting timer in response to the serving beam change at the UE.

Based on the first aspect, the non-transitory computer-readable medium of an eleventh aspect, wherein the report triggering event includes a pathloss measured on a current serving beam of the one or more serving beams, wherein a threshold trigger value of the pathloss is at least 15 dB.

A twelfth aspect of the non-transitory computer-readable medium of any combination of the first through eleventh aspects.

The present disclosure comprises a thirteenth aspect, such as a non-transitory computer-readable medium having program code recorded thereon, the program code comprising:

program code executable by a computer for causing the computer to receive, at a user equipment (UE), an identification signal from a serving base station, wherein the identification signal identifies one or more reference signals for pathloss measurement;

program code executable by the computer for causing the computer to measure, by the UE, a pathloss on the one or more reference signals identified by the identification signal;

program code executable by the computer for causing the computer to compare, by the UE, the pathloss to a threshold trigger value; and program code executable by the computer for causing the computer to activate, by the UE, power headroom reporting in response to the pathloss exceeding the threshold trigger value.

Based on the thirteenth aspect, the non-transitory computer-readable medium of a fourteenth aspect, wherein the one or more reference signals identified by the identification signal includes one of:

new radio (NR) synchronization signals (NR-SS); or
channel state information (CSI) reference signals (CSI-RS).

Based on the thirteenth aspect, the non-transitory computer-readable medium of a fifteenth aspect, wherein the one or more reference signals identified by the identification signal includes a subset of channel state information (CSI) reference signals (CSI-RS).

Based on the fifteenth aspect, the non-transitory computer-readable medium of a. sixteenth aspect, wherein each of the CSI-RS of the subset includes one of:

a beamforming gain above a threshold gain value;
a downlink beamforming gain within a predetermined range of an uplink beamforming gain.

Based on the thirteenth aspect, the non-transitory computer-readable medium of a seventeenth aspect, wherein the identification signal further includes a pathloss offset, wherein the pathloss offset corresponds to a downlink beamforming gain minus an uplink beamforming gain.

Based on the seventeenth aspect, the non-transitory computer-readable medium of an eighteenth aspect, wherein the pathloss offset corresponds to a sum of the downlink beamforming gain and a UE receive beamforming gain minus the uplink beamforming gain.

A nineteenth aspect of the non-transitory computer-readable medium of any combination of the thirteenth through eighteenth aspects The present disclosure comprises a twentieth aspect, such as a non-transitory computer-readable medium having program code recorded thereon, the program code comprising:

program code executable by a computer for causing the computer to determine, by a user equipment (UE), a time period since a last beam change of one or more serving beams received at the UE from a serving base station;

program code executable by the computer for causing the computer to measure, by the UE, a pathloss of a beam-specific layer 3 reference signal on a current serving beam in response to the time period exceeding a minimum time threshold; and program code executable by the computer for causing the computer to measure, by the UE, the pathloss of a beam-specific layer 1 reference signal on the current serving beam in response to the time period being below the minimum time threshold.

The present disclosure comprises a twenty-first aspect, such as an apparatus configured for wireless communication, the apparatus comprising:

at least one processor; and
a memory coupled to the at least one processor,
wherein the at least one processor is configured:
to determine, by a user equipment (UE), a beam-specific periodic power headroom report (PHR) in response to expiration of a first reporting timer, wherein the UE receives communications from a serving base station over one or more serving beams beamformed by the serving base station;

to transmit, by the UE, the beam-specific periodic PHR to the serving base station;
to detect, by the UE, a report triggering event;
to determine, by the UE, a UE-specific trigger PHR in response to the report triggering event and expiration of a second reporting timer;
to transmit, by the UE, the UE-specific trigger PHR to the serving base station.

Based on the twenty-first aspect, the apparatus of a twenty-second, wherein the configuration of the at least one processor to determine the beam-specific periodic PHR includes configuration of the at least one processor:

to measure a power headroom for each beam of the one or more serving beams; and
to generate an aggregate PHR including the power headroom for the each beam;

wherein the configuration of the at least one processor to transmit the beam-specific periodic PHR includes configuration to transmit the aggregate PHR.

Based on the twenty-second aspect, the apparatus of a twenty-third, wherein the configuration of the at least one processor to generate further includes configuration to add a beam identifier to the aggregate PHR, wherein the beam identifier indicates an associated beam of the one or more serving beams corresponding to the power headroom of the aggregate PHR.

Based on the twenty-first aspect, the apparatus of a twenty-fourth, further including configuration of the at least one processor to receive, at the UE, beam reporting configuration from the serving base station, wherein the beam reporting configuration configures the to report the beam-specific periodic PHR for each of the one or more serving beams at a different reporting occasion, wherein the configuration of the at least one processor to determine the beam-specific periodic PHR includes configuration to determine the beam-specific periodic PHR of a currently-scheduled beam of the one or more serving beams, and wherein the configuration of the at least one processor to transmit the beam-specific periodic PHR includes configuration to transmit the beam-specific periodic PHR of the currently-scheduled beam at a currently-scheduled reporting occasion.

Based on the twenty-fourth aspect, the apparatus of a twenty-fifth, wherein the beam reporting configuration includes one of:

a different period of the first reporting tinier for each of the one or more serving beams; or
a different offset to the first reporting timer for each of the one or more serving beams.

Based on the twenty-first aspect, the apparatus of a twenty-sixth, wherein the configuration of the at least one processor to determine the UE-specific trigger PHR includes configuration to measure a power headroom for a current serving beam of the one or more serving beams, wherein the UE-specific trigger PHR includes the power headroom for the current serving beam.

Based on the twenty-first aspect, the apparatus of a twenty-seventh wherein the configuration of the at least one processor to determine the UE-specific trigger PHR includes configuration of the at least one processor:

to measure a power headroom for each beam of the one or more serving beams; and to generate an aggregate trigger PHR including the power headroom for the each beam;
wherein the configuration of the at least one processor to transmit the UE-specific trigger PHR includes configuration to transmit the aggregate trigger PHR.

Based on the twenty-first aspect, the apparatus of a twenty-eighth, wherein the second reporting timer and threshold trigger value of the report triggering event are common to the UE and shared across the one or more serving beams, such that a serving beam change does not trigger restart of the second reporting timer.

Based on the twenty-first aspect, the apparatus of a twenty-ninth, wherein the report triggering event includes one or more of:
  a pathloss measured on a current serving beam of the one or more serving beams; and
  a serving beam change at the UE.

Based on the twenty-ninth aspect, the apparatus of a thirtieth aspect, further including configuration of the at least one processor to reset the second reporting timer in response to the serving beam change at the UE.

Based on the twenty-first aspect, the apparatus of a thirty-first aspect, wherein the report triggering event includes a pathloss measured on a current serving beam of the one or more serving beams, wherein a threshold trigger value of the pathloss is at least 15 dB.

A thirty-second aspect of the non-transitory computer-readable medium of any combination of the twenty-first through thirty-first aspects The present disclosure comprises a thirty-third aspect, such as an apparatus configured for wireless communication, the apparatus comprising:
  at least one processor; and
  a memory coupled to the at least one processor,
  wherein the at least one processor is configured:
    to receive, at a user equipment (UE), an identification signal from a serving base station, wherein the identification signal identifies one or more reference signals for pathloss measurement;
    to measure, by the UE, a pathloss on the one or more reference signals identified by the identification signal;
    to compare, by the UE, the pathloss to a threshold trigger value; and
    to activate, by the UE, power headroom reporting in response to the pathloss exceeding the threshold trigger value.

Based on the thirty-third aspect, the apparatus of a thirty-fourth aspect, wherein the one or more reference signals identified by the identification signal includes one of:
  new radio (NR) synchronization signals (NR-SS); or
  channel state information (CSI) reference signals (CSI-RS).

Based on the thirty-third aspect, the apparatus of a thirty-fifth aspect, wherein the one or more reference signals identified by the identification signal includes a subset of channel state information (CSI) reference signals (CSI-RS).

Based on the thirty-fifth aspect, the apparatus of a thirty-sixth aspect, wherein each of the CSI-RS of the subset includes one of:
  a beamforming gain above a threshold gain value;
  a downlink beamforming gain within a predetermined range of an uplink beamforming gain.

Based on the thirty-third aspect, the apparatus of a thirty-seventh aspect, wherein the identification signal further includes a pathloss offset, wherein the pathloss offset corresponds to a downlink beamforming gain minus an uplink beamforming gain.

Based on the thirty-seventh aspect, the apparatus of a thirty-eighth aspect, wherein the pathloss offset corresponds to a sum of the downlink beamforming gain and a UE receive beamforming gain minus the uplink beamforming gain.

A thirty-ninth aspect of the non-transitory computer-readable medium of any combination of the thirty-third through thirty-eighth aspects The present disclosure comprises a fortieth aspect, such as an apparatus configured for wireless communication, the apparatus comprising:
  at least one processor; and
  a memory coupled to the at least one processor,
  wherein the at least one processor is configured:
    to determine, by a user equipment (UE), a time period since a last beam change of one or more serving beams received at the UE from a serving base station;
    to measure, by the UE, a pathloss of a beam-specific layer 3 reference signal on a current serving beam in response to the time period exceeding a minimum time threshold; and
    to measure, by the UE, the pathloss of a beam-specific layer 1 reference signal on the current serving beam in response to the time period being below the minimum time threshold.

The functional blocks and modules in FIGS. 4, 7, and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a user equipment (UE), a beam-specific periodic power headroom report (PHR) in response to expiration of a first reporting timer, wherein the UE receives communications from a serving base station over one or more serving beams beamformed by the serving base station;
   transmitting, by the UE, the beam-specific periodic PHR to the serving base station;
   detecting, by the UE, a report triggering event, wherein the report triggering event includes one or more of:
      a pathloss measured on a current serving beam of the one or more serving beams; and
      a serving beam change at the UE;
   determining, by the UE, a UE-specific trigger PHR in response to the report triggering event and expiration of a second reporting timer; and
   transmitting, by the UE, the UE-specific trigger PHR to the serving base station.

2. The method of claim 1,
   wherein the determining the beam-specific periodic PHR includes:
      measuring a power headroom for each beam of the one or more serving beams; and
      generating an aggregate PHR including the power headroom for the each beam;
   wherein the transmitting the beam-specific periodic PHR includes transmitting the aggregate PHR.

3. The method of claim 2, wherein the generating further includes:
   adding a beam identifier to the aggregate PHR, wherein the beam identifier indicates an associated beam of the one or more serving beams corresponding to the power headroom of the aggregate PHR.

4. The method of claim 1, further including:
   receiving, at the UE, beam reporting configuration from the serving base station, wherein the beam reporting configuration configures the UE to report the beam-specific periodic PHR for each of the one or more serving beams at a different reporting occasion,
      wherein the determining the beam-specific periodic PHR includes determining the beam-specific periodic PHR of a currently-scheduled beam of the one or more serving beams, and
      wherein the transmitting the beam-specific periodic PHR includes transmitting the beam-specific periodic PHR of the currently-scheduled beam at a currently-scheduled reporting occasion.

5. The method of claim 4, wherein the beam reporting configuration includes one of:
   a different period of the first reporting timer for each of the one or more serving beams; or
   a different offset to the first reporting timer for each of the one or more serving beams.

6. The method of claim 1,
   wherein the determining the UE-specific trigger PHR includes measuring a power headroom for a current serving beam of the one or more serving beams,
   wherein the UE-specific trigger PHR includes the power headroom for the current serving beam.

7. The method of claim 1,
   wherein the determining the UE-specific trigger PHR includes:

measuring a power headroom for each beam of the one or more serving beams; and
generating an aggregate trigger PHR including the power headroom for the each beam;
wherein the transmitting the UE-specific trigger PHR includes transmitting the aggregate trigger PHR.

8. The method of claim 1, wherein the second reporting timer and threshold trigger value of the report triggering event are common to the UE and shared across the one or more serving beams, such that a serving beam change does not trigger restart of the second reporting timer.

9. The method of claim 1, further including:
resetting the second reporting timer in response to the serving beam change at the UE.

10. The method of claim 1, wherein the report triggering event includes a pathloss measured on a current serving beam of the one or more serving beams, wherein a threshold trigger value of the pathloss is at least 15 dB.

11. A method of wireless communication, comprising:
determining, by a user equipment (UE), a time period since a last beam change of one or more serving beams received at the UE from a serving base station;
measuring, by the UE, a pathloss of a beam-specific layer 3 reference signal on a current serving beam in response to the time period exceeding a minimum time threshold; and
measuring, by the UE, the pathloss of a beam-specific layer 1 reference signal on the current serving beam in response to the time period being below the minimum time threshold.

12. An apparatus configured for wireless communication, comprising:
means for determining, by a user equipment (UE), a beam-specific periodic power headroom report (PHR) in response to expiration of a first reporting timer, wherein the UE receives communications from a serving base station over one or more serving beams beamformed by the serving base station;
means for transmitting, by the UE, the beam-specific periodic PHR to the serving base station;
means for detecting, by the UE, a report triggering event, wherein the report triggering event includes one or more of:
a pathloss measured on a current serving beam of the one or more serving beams; and
a serving beam change at the UE;
means for determining, by the UE, a UE-specific trigger PHR in response to the report triggering event and expiration of a second reporting timer; and
means for transmitting, by the UE, the UE-specific trigger PHR to the serving base station.

13. The apparatus of claim 12,
wherein the means for determining the beam-specific periodic PHR includes:
means for measuring a power headroom for each beam of the one or more serving beams; and
means for generating an aggregate PHR including the power headroom for the each beam;
wherein the means for transmitting the beam-specific periodic PHR includes means for transmitting the aggregate PHR.

14. The apparatus of claim 13, wherein the means for generating further includes:
means for adding a beam identifier to the aggregate PHR, wherein the beam identifier indicates an associated beam of the one or more serving beams corresponding to the power headroom of the aggregate PHR.

15. The apparatus of claim 12, further including:
means for receiving, at the UE, beam reporting configuration from the serving base station, wherein the beam reporting configuration configures the UE to report the beam-specific periodic PHR for each of the one or more serving beams at a different reporting occasion,
wherein the means for determining the beam-specific periodic PHR includes means for determining the beam-specific periodic PHR of a currently-scheduled beam of the one or more serving beams, and
wherein the means for transmitting the beam-specific periodic PHR includes means for transmitting the beam-specific periodic PHR of the currently-scheduled beam at a currently-scheduled reporting occasion.

16. The apparatus of claim 15, wherein the beam reporting configuration includes one of:
a different period of the first reporting timer for each of the one or more serving beams; or
a different offset to the first reporting timer for each of the one or more serving beams.

17. The apparatus of claim 12,
wherein the means for determining the UE-specific trigger PHR includes means for measuring a power headroom for a current serving beam of the one or more serving beams,
wherein the UE-specific trigger PHR includes the power headroom for the current serving beam.

18. The apparatus of claim 12,
wherein the means for determining the UE-specific trigger PHR includes:
means for measuring a power headroom for each beam of the one or more serving beams; and
means for generating an aggregate trigger PHR including the power headroom for the each beam;
wherein the means for transmitting the UE-specific trigger PHR includes means for transmitting the aggregate trigger PHR.

19. The apparatus of claim 12, wherein the second reporting timer and threshold trigger value of the report triggering event are common to the UE and shared across the one or more serving beams, such that a serving beam change does not trigger restart of the second reporting timer.

20. The apparatus of claim 12, further including:
means for resetting the second reporting timer in response to the serving beam change at the UE.

21. The apparatus of claim 12, wherein the report triggering event includes a pathloss measured on a current serving beam of the one or more serving beams, wherein a threshold trigger value of the pathloss is at least 15 dB.

22. An apparatus configured for wireless communication, comprising:
means for determining, by a user equipment (UE), a time period since a last beam change of one or more serving beams received at the UE from a serving base station;
means for measuring, by the UE, a pathloss of a beam-specific layer 3 reference signal on a current serving beam in response to the time period exceeding a minimum time threshold; and means for measuring, by the UE, the pathloss of a beam-specific layer 1 reference signal on the current serving beam in response to the time period being below the minimum time threshold.

23. An apparatus for wireless communication, the apparatus comprising:

at least one processor; and
a memory coupled to the at least one processor, wherein the at least one processor is configured to perform operations including:
- determining, by a user equipment (UE), a beam-specific periodic power headroom report (PHR) in response to expiration of a first reporting timer, wherein the UE receives communications from a serving base station over one or more serving beams beamformed by the serving base station;
- transmitting, by the UE, the beam-specific periodic PHR to the serving base station;
- detecting, by the UE, a report triggering event, wherein the report triggering event includes one or more of:
  - a pathloss measured on a current serving beam of the one or more serving beams; and
  - a serving beam change at the UE;
- determining, by the UE, a UE-specific trigger PHR in response to the report triggering event and expiration of a second reporting timer; and
- transmitting, by the UE, the UE-specific trigger PHR to the serving base station.

24. The apparatus of claim 23,
wherein the determining the beam-specific periodic PHR includes:
measuring a power headroom for each beam of the one or more serving beams; and
generating an aggregate PHR including the power headroom for the each beam;
wherein the transmitting the beam-specific periodic PHR includes transmitting the aggregate PHR.

25. The apparatus of claim 24, wherein the generating further includes:
adding a beam identifier to the aggregate PHR, wherein the beam identifier indicates an associated beam of the one or more serving beams corresponding to the power headroom of the aggregate PHR.

26. The apparatus of claim 23, further including:
receiving, at the UE, beam reporting configuration from the serving base station, wherein the beam reporting configuration configures the UE to report the beam-specific periodic PHR for each of the one or more serving beams at a different reporting occasion,
wherein the determining the beam-specific periodic PHR includes determining the beam-specific periodic PHR of a currently-scheduled beam of the one or more serving beams, and
wherein the transmitting the beam-specific periodic PHR includes transmitting the beam-specific periodic PHR of the currently-scheduled beam at a currently-scheduled reporting occasion.

27. The apparatus of claim 26, wherein the beam reporting configuration includes one of:
a different period of the first reporting timer for each of the one or more serving beams; or
a different offset to the first reporting timer for each of the one or more serving beams.

28. The apparatus of claim 23,
wherein the determining the UE-specific trigger PHR includes measuring a power headroom for a current serving beam of the one or more serving beams,
wherein the UE-specific trigger PHR includes the power headroom for the current serving beam.

29. The apparatus of claim 23,
wherein the determining the UE-specific trigger PHR includes:
measuring a power headroom for each beam of the one or more serving beams; and
generating an aggregate trigger PHR including the power headroom for the each beam;
wherein the transmitting the UE-specific trigger PHR includes transmitting the aggregate trigger PHR.

30. The apparatus of claim 23, wherein the second reporting timer and threshold trigger value of the report triggering event are common to the UE and shared across the one or more serving beams, such that a serving beam change does not trigger restart of the second reporting timer.

31. The apparatus of claim 23, further including:
resetting the second reporting timer in response to the serving beam change at the UE.

32. The apparatus of claim 23, wherein the report triggering event includes a pathloss measured on a current serving beam of the one or more serving beams, wherein a threshold trigger value of the pathloss is at least 15 dB.

33. An apparatus for wireless communication, the apparatus comprising:
at least one processor; and
a memory coupled to the at least one processor, wherein the at least one processor is configured to perform operations including:
determining, by a user equipment (UE), a time period since a last beam change of one or more serving beams received at the UE from a serving base station;
measuring, by the UE, a pathloss of a beam-specific layer 3 reference signal on a current serving beam in response to the time period exceeding a minimum time threshold; and
measuring, by the UE, the pathloss of a beam-specific layer 1 reference signal on the current serving beam in response to the time period being below the minimum time threshold.

* * * * *